United States Patent
Svoboda et al.

[11] Patent Number: 5,954,345
[45] Date of Patent: Sep. 21, 1999

[54] GROMMET FOR TRANSMISSION OIL FILL TUBE

[75] Inventors: Matthew Svoboda, East Lansing; David A. Salvatori, South Lyon; David Rygiel, Howell; Jason Frisch, Plymouth; Jeff Japinga, West Bloomfield, all of Mich.

[73] Assignee: Chrysler Corporation, Auburn Hills, Mich.

[21] Appl. No.: 08/729,263

[22] Filed: Oct. 10, 1996

[51] Int. Cl.⁶ ............................. F16L 17/025; F16L 17/03
[52] U.S. Cl. ..................... 277/626; 277/606; 277/917; 16/2.3; 285/4; 285/338
[58] Field of Search ................. 285/4, 139.2, 141.1, 285/196, 338; 277/606, 626, 917, 615, 651; 16/2.3

[56] References Cited

U.S. PATENT DOCUMENTS

| | | | |
|---|---|---|---|
| 3,325,174 | 6/1967 | Weaver | 277/615 X |
| 3,771,800 | 11/1973 | Wilson et al. | 277/187 |
| 4,194,750 | 3/1980 | Sovish et al. | 277/615 |
| 4,739,899 | 4/1988 | Thompson et al. | 220/240 |
| 4,746,023 | 5/1988 | Belter | 277/917 X |
| 4,881,659 | 11/1989 | Uchiyama et al. | 220/319 |
| 4,902,043 | 2/1990 | Zillig et al. | 285/4 |
| 4,959,509 | 9/1990 | Takeuchi et al. | 277/606 |
| 5,014,445 | 5/1991 | Martell | 33/731 |
| 5,086,943 | 2/1992 | Poskie | 220/374 |
| 5,190,180 | 3/1993 | Crone | 220/86.2 |
| 5,404,906 | 4/1995 | Aoshima et al. | 137/587 |
| 5,441,168 | 8/1995 | Carlini | 220/378 |
| 5,456,296 | 10/1995 | Taylor et al. | 141/5 |

*Primary Examiner*—James R. Brittain
*Assistant Examiner*—Gary Grafel
*Attorney, Agent, or Firm*—William J. Coughlin

[57] ABSTRACT

A grommet includes a hollow cylindrical body that is positionable in a bore hole of a transmission case and into which an oil fill tube can be advanced, to thereby establish a seal between the tube and case. The grommet defines an open top end, and a scored membrane is formed integrally with the body to cover the top end. Consequently, the grommet can be positioned in the bore hole to cover the bore hole prior to engaging the oil fill tube with the bore hole, thereby permitting pressure testing of the transmission case and preventing contaminants from entering the case. The oil fill tube can then be advanced through the membrane and into the bore hole.

11 Claims, 1 Drawing Sheet

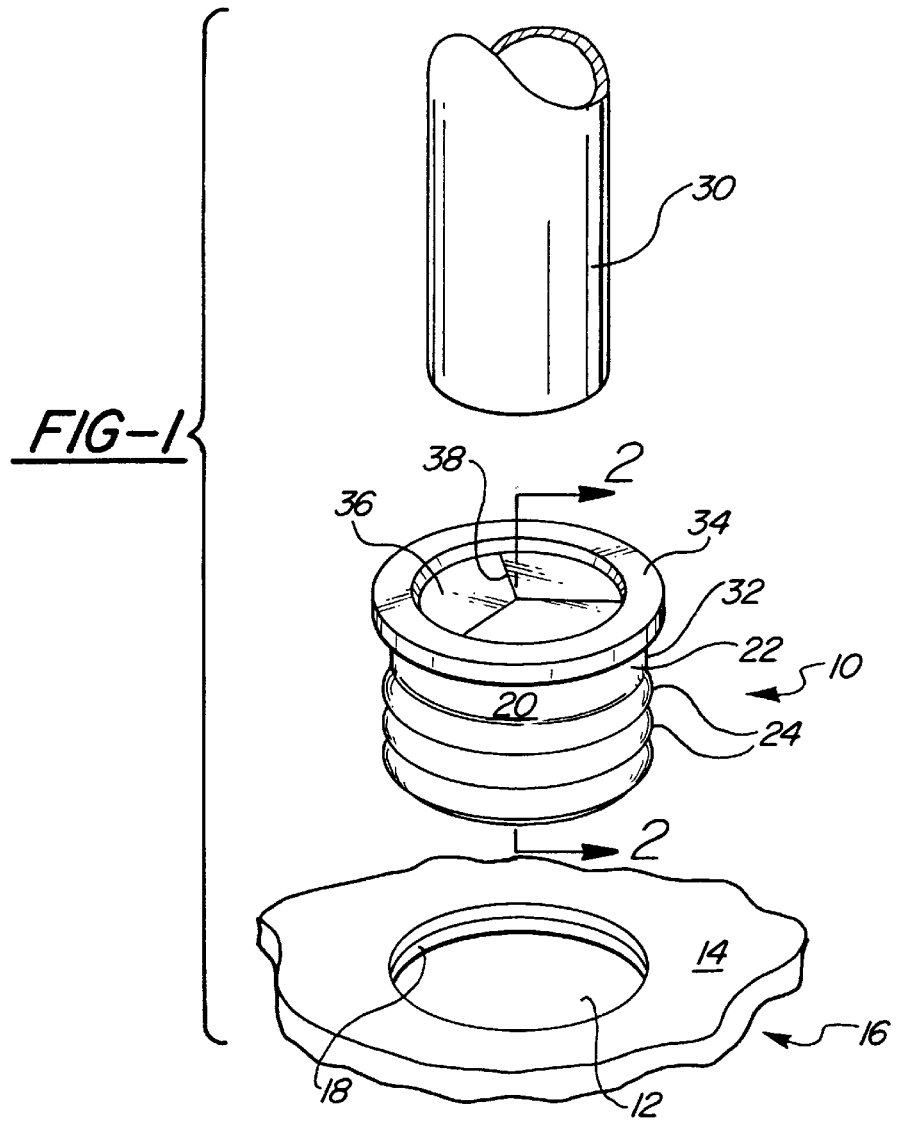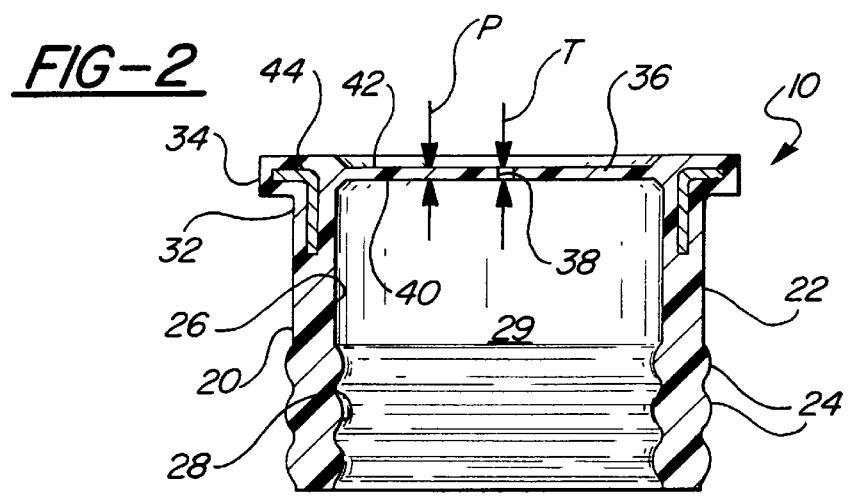

GROMMET FOR TRANSMISSION OIL FILL TUBE

FIELD OF INVENTION

The present invention relates generally to vehicle transmissions, and more particularly to methods and apparatus for establishing a seal between a transmission case and a transmission oil fill tube.

BACKGROUND OF THE INVENTION

Grommets are used to establish seals between vehicular transmission case bore holes and oil fill tubes that are advanced into the bore holes. More particularly, a grommet in the form of an o-ring or other annular resilient sealing device is positioned in a bore hole of a transmission case between the case and an associated oil fill tube to prevent leakage of transmission oil between the tube and case. Accordingly, existing transmission bore hole sealing grommets are annular, and consequently are formed with a hole through which the transmission oil fill tube is positioned.

Typically, a transmission oil fill tube is not positioned in the bore hole of a transmission case until after the case has been manufactured and tested. Because such pre-assembly testing ordinarily includes pressurizing or evacuating the transmission case and then measuring the decay of the pressure/vacuum, the temporarily empty bore hole consequently must be plugged.

Also, after testing but before installation of the oil fill tube, the transmission case might be transported. It is desirable to keep contaminants out of the case during transportation, so once again the bore hole must be covered. Moreover, it is desirable to eliminate the entrance of contaminants into the transmission case via the bore hole during installation of the oil fill tube. Unfortunately, existing oil fill tube grommets are useful only for establishing a seal between the oil fill tube and the transmission case after the tube has been installed. Consequently, other means currently are required to seal the bore hole prior to oil fill tube installation for the reasons stated above. As recognized by the present invention, however, a transmission oil fill tube grommet can be provided which not only establishes a seal between an oil fill tube and a transmission case, but which can plug an oil fill tube bore hole during transmission case testing, transmission case transportation, and oil fill tube installation.

Accordingly, it is an object of the present invention to provide a transmission oil fill tube grommet which can establish a seal between the tube and a transmission case in which the tube is received. Another object of the present invention is to provide a transmission oil fill tube grommet which covers a transmission case bore hole prior to installation of an oil fill tube in the bore hole. Still another object of the present invention is to provide a transmission oil fill tube grommet which is easy to use and cost-effective to manufacture.

SUMMARY OF THE INVENTION

A device is disclosed for covering a bore hole in a transmission case and for establishing a seal between an oil fill tube and the transmission case when the tube is positioned in the bore hole. The device of the present invention includes a hollow body defining a generally cylindrical outer wall configured for sealingly engaging the bore hole. Also, the body defines a generally cylindrical inner wall for sealingly engaging the oil fill tube. Moreover, the body defines a top end. A membrane covers the top end such that the device can be positioned in the bore hole to block the bore hole. As described in detail below, the membrane is frangible by the oil fill tube when the oil fill tube is urged into the membrane. The device establishes a seal between the oil fill tube and the transmission case when the oil fill tube is positioned in the bore hole.

In a presently preferred embodiment, a flange is formed on the body, and the flange circumscribes the top end. Additionally, a steel stiffener having an L-shaped cross-section is embedded in the body and flange.

To promote sealing engagement with the transmission case, a plurality of outer ribs is formed on the outer wall, with the outer ribs circumscribing the outer wall. Similarly, to promote sealing engagement with the oil fill tube, a plurality of inner ribs is formed on the inner wall, with the inner ribs circumscribing the inner wall. The membrane is formed with a plurality of radial scores for facilitating frangibility of the membrane when the oil fill tube is urged against the membrane into the bore hole.

In another aspect of the present invention, a transmission oil fill tube grommet includes a cylindrical body configured for engaging a bore hole in a transmission case. In accordance with the present invention, the body defines a tube passageway for sealingly receiving a transmission oil fill tube therein. A plurality of outer ribs circumscribe the body and extend radially outwardly therefrom, and a frangible membrane covers the passageway.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of the transmission oil fill tube grommet, an exploded relationship with a transmission case and a transmission oil fill tube; and FIG. 2 is a cross-sectional view of the grommet, as seen along the lie 2—2 in FIG. 1.

DETAILED DESCRIPTION OF THE PREFERRED EMBODIMENT

Referring initially to FIG. 1, a device is shown, generally designated 10, for covering a bore hole 12 that is formed in a transmission case 14 of a vehicle, generally designated 16. In the embodiment shown in FIG. 1, the bore hole 12 can be formed with an annular lip 18 that circumscribes the interior wall of the bore hole.

As shown in cross-reference to FIGS. 1 and 2, the grommet 10 includes a hollow body 20 defining an outer wall 22 that is generally cylindrical except for a plurality of, preferably three (3), spaced apart outer ribs 24 that circumscribe the outer wall 22 and that protrude radially outwardly therefrom. The grommet 10 is configured such that the grommet 10 is tightly received in the bore hole 12, with the outer wall 22 with ribs 24 sealingly engaged with the transmission case 14 after the oil fill tube described below has been installed in the bore hole 12.

Additionally, the body 20 defines a generally cylindrical inner wall 26 that is formed with a plurality of inner ribs 28. As shown best in FIG. 2, the inner ribs 28 circumscribe the inner wall 26, and a tube passageway 29 is established by the inner wall 26 for sealingly receiving a transmission oil fill tube 30. In other words, the inner wall 26 with ribs 28 is configured for sealingly engaging the oil fill tube 30.

Continuing with the description of the grommet of the present invention, the body 20 defines an open top end 32. A disc-shaped flange 34 is formed on the body 20, and the flange 34 circumscribes the top end 32.

In accordance with the present invention, a membrane 36 covers the top end 32, with the membrane 36 being formed integrally with the flange 34 and body 20 from a resilient grommet material such as, e.g., the material marketed under the trade name "Vaymac 1008". As can best be appreciated in reference to FIG. 2, the membrane 36 is thinner than the wall of the body 20. In the presently preferred embodiment, the thickness "T" of the membrane 36 is equal to seven-tenths of a millimeter (0.7 mm).

As envisioned by the present invention, the membrane 36 is formed with a plurality of, preferably three, scores 38 that are formed as channels in one or both of a bottom surface 40 and top surface 42 of the membrane 36. In the example shown in FIG. 2, the scores 38 are formed in the bottom surface 40, and each score 38 has a depth "D" of about five-tenths of a millimeter (0.5 mm). Thus, the thickness of the membrane 36 along each score 38 is two-tenths of a millimeter (0.2 mm). In the preferred embodiment shown, the membrane 36 defines a circle, and each score 38 defines a radius of the circle, with the radii defined by the scores 38 being angularly equidistant from each other. As the skilled artisan will appreciate, the scores 38 facilitate frangibility of the membrane 36.

FIG. 2 shows that an annular stainless steel stiffener 44 is embedded in the body 20 and flange 34. As shown in FIG. 2, the steel stiffener 44 is characterized by an L-shaped cross-section, with one leg of the "L" being disposed in the flange 34 and the other leg being disposed in the body 20. The stiffener 44 assists in pre-sealing and vertically locating the grommet 10 in the bore hole 12.

With the above-described combination of structure, the grommet 10 can be positioned in the bore hole 12, with the top end 32 of the body 20 press-fit into the bore hole 12 and the flange 34 abutting the lip 18. Thereby, the grommet 10 sealingly blocks the bore hole 12, facilitating pressure testing of the transmission case 14 and preventing contaminants from entering the case 14.

Moreover, with the above-described structure including the particularly preferred membrane 36 and score 38 thicknesses and depths disclosed herein, the membrane 36 is sufficiently strong to undertake the blocking functions discussed above, including keeping contaminants from entering the transmission during the tube installation process and sealing the transmission oil inside the transmission during installation, while being sufficiently frangible such that the membrane 36 is relatively easily broken by the oil fill tube 30 when the oil fill tube 30 is urged into the membrane 36. Stated differently, the oil fill tube 30 can be urged downwardly in FIG. 1 against the membrane 36 to break the membrane 36 and to position the oil fill tube 30 in the bore hole 12.

As the oil fill tube 30 is advanced through the grommet 10 into the bore hole 12, the broken membrane 36 seals the periphery of the oil fill tube 30 to prevent contaminants from entering the transmission case 14. Thus, the membrane 36 remains attached to the body 20 after breaking, becoming permanently trapped between the oil fill tube 30 and the body 20. When the oil fill tube 30 is positioned in the bore hole 12, the grommet 10 establishes a seal between the oil fill tube 30 and the transmission case 14.

While the particular GROMMET FOR TRANSMISSION OIL FILL TUBE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A transmission case comprising:

an oil fill tube;

a body defining a bore hole for receiving said oil fill tube;

a hollow body defining a generally cylindrical outer wall configured for sealingly engaging the bore hole and a generally cylindrical inner wall for sealingly engaging the oil fill tube, the body defining a top end, said outer wall having a plurality of outer annular ribs, said inner wall having a plurality of inner annular ribs;

a membrane covering the top end such that the device can be positioned in the bore hole to block the bore hole, the membrane being frangible by the oil fill tube when the oil fill tube is urged into the membrane, such that the device establishes a seal between the oil fill tube and the transmission case when the oil fill tube is positioned in the bore hole;

a flange extending from and circumscribing the top end; and a steel stiffener embedded in the body and the flange.

2. The device of claim 1, wherein the steel stiffener is characterized by an L-shaped cross-section.

3. The device of claim 1, wherein the membrane is formed with a plurality of scores for facilitating frangibility of the membrane.

4. The device of claim 3, wherein the membrane defines a circle, and each score defines a radius of the circle.

5. A transmission oil fill tube grommet, comprising:

a cylindrical body configured for engaging a bore hole in a transmission case, the body defining a tube passageway for sealingly receiving a transmission oil fill tube therein, the body having a top end;

a flange circumscribing and extending from the top end:

a plurality of inner ribs extending radially inward from said cylindrical body;

a plurality of outer ribs circumscribing the body and extending radially outwardly therefrom; and a frangible membrane covering the passageway, said frangible membrane integrally formed with said cylindrical body;

a L-shaped stiffener embedded in the body and the flange.

6. The grommet of claim 5, wherein the membrane is formed with a plurality of scores for facilitating frangibility of the membrane.

7. The grommet of claim 6, wherein the membrane defines a circle, and each score defines a radius of the circle.

8. A vehicular transmission case formed with a bore hole, comprising:

a cylindrical body configured for engaging the bore hole and defining a tube passageway for sealingly receiving a transmission oil fill tube therein;

a plurality of inner ribs inwardly extending from said cylindrical body;

a plurality of outer ribs circumscribing the body and extending radially outwardly therefrom;

a frangible membrane covering the passageway, said frangible membrane integrally formed with said cylindrical body; and an L-shaped stiffener embedded in said cylindrical body, said stiffener having an axially extending leg substantially shorter than said cylindrical body and a radially extending leg radially extending outwardly.

9. The vehicular transmission case of claim 8, wherein the body defines a top end and the vehicular transmission case further comprises a flange formed on the body and circumscribing the top end.

10. The vehicular transmission case of claim 9, wherein the membrane defines a circle and is formed with a plurality of radial scores for facilitating frangibility of the membrane.

11. A transmission case comprising:

an oil fill tube;

a body defining a bore hole;

a grommet assembly including a hollow body defining a generally outer wall in sealing engagement with said bore hole, said outer wall including a plurality of annular outer ribs, said hollow body further defining a generally cylindrical inner wall for sealingly engaging said oil fill tube, said inner wall including a plurality of annular inner ribs, said grommet assembly further including a membrane integrally formed with said hollow body and covering a top end of said hollow body such that said grommet assembly can be positioned in the bore hole to block the bore hole, the membrane being frangible by the oil fill tube when the oil fill tube is urged into the membrane such that the device establishes a seal between the oil fill tube and the transmission case when the oil fill tube is positioned in the bore hole;

said grommet assembly including a L-shaped stiffener embedded in said hollow body, said L-shaped stiffener having an axially extending leg substantially shorter than said hollow body and a radially extending leg which extends radially outward.

* * * * *